(12) United States Patent
Walters

(10) Patent No.: US 9,108,136 B2
(45) Date of Patent: Aug. 18, 2015

(54) DUST COLLECTOR WITH SPARK ARRESTER

(71) Applicant: CAMFIL FARR, INC., Riverdale, NJ (US)

(72) Inventor: Michael C. Walters, Jonesboro, AR (US)

(73) Assignee: Camfil USA, Inc., Riverdale, NJ (US)

( * ) Notice: Subject to any disclaimer, the term of this patent is extended or adjusted under 35 U.S.C. 154(b) by 44 days.

(21) Appl. No.: 13/766,279

(22) Filed: Feb. 13, 2013

(65) Prior Publication Data
US 2014/0224123 A1    Aug. 14, 2014

(51) Int. Cl.
| | |
|---|---|
| *B01D 45/00* | (2006.01) |
| *B01D 45/08* | (2006.01) |
| *B01D 46/24* | (2006.01) |
| *B01D 50/00* | (2006.01) |

(52) U.S. Cl.
CPC ............ *B01D 45/08* (2013.01); *B01D 46/2403* (2013.01); *B01D 50/002* (2013.01)

(58) Field of Classification Search
CPC ... B01D 45/08; B01D 50/002; B01D 46/2403
USPC ............ 55/332, 462, 428, 442–446, DIG. 20, 55/318, 320; 95/272
See application file for complete search history.

(56) References Cited

U.S. PATENT DOCUMENTS

| | | |
|---|---|---|
| 7,922,784 B2 | 4/2011 | Saeed et al. |
| 8,172,930 B2 | 5/2012 | Barkdoll |
| 8,177,873 B2 | 5/2012 | Kathol et al. |
| 2006/0112666 A1* | 6/2006 | Andersen ..................... 55/341.1 |

FOREIGN PATENT DOCUMENTS

CN         202191805 U      4/2012

OTHER PUBLICATIONS

Plymovent Group BV; Sparkshield Brochure.
QAManage Product Sheet; "Spark Arrestors & Coolers"; Aug. 20, 2007 (Revised Jun. 29, 2011).
Robovent; "Great Lakes Air Systems, Inc. Presents SparkOut System"; Oct. 6, 2008; Clawson, Michigan.

* cited by examiner

*Primary Examiner* — Dung H Bui
(74) *Attorney, Agent, or Firm* — Patterson & Sheridan, LLP

(57) ABSTRACT

A spark arrestor and dust arrestor for same are provided. In one embodiment, the spark arrestor includes a housing having an inlet and an outlet, wherein the outlet is positioned on a dust arrestor mounting side of the housing, and a turn baffle disposed in the housing in a position that creates a tortuous flow path through the housing between the inlet and the outlet. The tortuous flow path includes a low inertia channel formed in the housing having an orientation that directs particles passing through the low inertia channel through an upper portion of the outlet of the housing, and a high inertia channel formed in the housing, wherein a downstream portion of the high inertia channel has an orientation that directs particles passing through the high inertia channel through a lower portion of the outlet of the housing.

11 Claims, 5 Drawing Sheets

DUST COLLECTOR WITH SPARK ARRESTER

BACKGROUND

1. Field

The present invention relates to a spark arrester and a dust collector for use with same.

2. Description of the Related Art

In many dust collector systems, a spark arrestor is employed in the ductwork upstream of a dust collector to prevent combustible materials, such as sparks, from entering into the dust collector and damaging the air filters mounted in the dust collector. Common applications for spark arrestors include dust collectors for use in welding, plasma cutting, laser cutting, metal reclaiming and processing, and other spark producing operations.

FIG. 1 illustrates a partial cut away elevation of a conventional dust collector 100 coupled in series with a conventional spark arrestor 102. The dust collector 100 includes a housing 104 that is coupled to an air mover 106, such as a fan or blower, for drawing air, as shown by arrows 138, from a work place 132 through at least one replaceable air filter 108 mounted in the housing 104. The air mover 106 may be mounted to or be remote from the housing 104. The housing 104 is constructed from a rigid material suitable to withstand the operational pressures and loading for which the particular dust collector is designed. The housing 104 includes an inlet 110, an outlet 112. The housing 104 is supported by legs 114 and includes a tube sheet 116 which separates the interior of the housing 104 into a dirty air plenum 118 and a clean air plenum 120. The dirty air plenum 118 is in communication with the inlet 110 of the housing 104 while the clean air plenum 120 is in communication with the outlet 112 of the housing 104. The one or more air filters 108 are sealingly mounted to the tube sheet 116 such that air passing through a filter aperture 122 formed through the tube sheet 116 from the dirty air plenum 118 to the clean air plenum 120 must first pass through at least one air filter 108.

Not shown in FIG. 1, the dust collector 100 may optionally include a filter cleaning system which is operable to remove at least a portion of the dust cake formed on the air filter 108 during operation. The filter cleaning system may vibrate, shock or utilized air jets to knock at least a portion of the dust cake formed on the air filter into a collection hopper 124 formed in the lower portion of the housing 104. The collection hopper 124 includes a door 126 which may be periodically opened to remove the dust or other filtered materials from the dust collector 100.

The conventional spark arrestor 102 is generally located in ductwork 128 upstream of and well spaced-apart from the inlet 110 of the dust collector 100 between an inlet 130 of the ductwork 128 (i.e., positioned proximate the workplace 132 where the sparks are generated) and the dust collector 100. The conventional spark arrestor 102 includes a spark collection hopper 134 and a door 136 which may be periodically opened to remove extinguished sparks from the conventional spark arrestor 102.

In operation, particulates and sparks 140, generated at the workplace 132 are entrained in the air 138 that enters ductwork 128 at the inlet 130. The air 138 flows through the ductwork 128 and enters the conventional spark arrestor 102. The conventional spark arrestor 102 may be a baffle box or other device configured to arrest sparks. The baffle box, as shown in FIG. 1, has a baffle plate which separates sparks 140 from the air passing through the spark arrestor 102. Separated sparks 140 are dropped into the spark collection hopper 134. The air 138 exiting the conventional spark arrestor 102 continues through the ductwork 128 and into the dust collector 100 through the inlet 110.

The conventional spark arrestor 102 is generally isolated from the dust collector 100 and requires cleaning and maintenance, such as emptying the spark collection hopper 134, in addition to the cleaning and maintenance already required for the dust collector 100 itself. This makes the conventional spark arrestor 102 difficult and time consuming to maintain, particularly if the ductwork containing the spark arrestor is not easily accessible.

Therefore, there is a need for an apparatus for removing sparks entrained in an air flow prior to filtering.

SUMMARY

A spark arrestor, dust collector, and method for removing sparks entrained in an air flow are provided. In one embodiment, the spark arrestor includes a housing having an inlet and an outlet, wherein the outlet is positioned on a dust collector mounting side of the housing, and a turn baffle disposed in the housing in a position that creates a tortuous flow path through the housing between the inlet and the outlet. The tortuous flow path includes a low inertia channel formed in the housing having an orientation that directs particles passing through the low inertia channel through an upper portion of the outlet of the housing, and a high inertia channel formed in the housing, wherein a downstream portion of the high inertia channel has an orientation that directs particles passing through the high inertia channel through a lower portion of the outlet of the housing.

In one embodiment a dust collector includes housing having a filter mounting arrangement configured to retain replaceable air filters within the housing. The housing has a dust collection hopper positioned below the filter mounting arrangement and a spark arrestor attached to the housing. The spark arrestor has no dust collection hopper and the spark arrestor is configured to separate high inertia particles flowing through the spark arrestor in a tortuous flow path preferentially into a first channel relative to a second channel by particle inertia. The second channel has an orientation that directs high inertia particles exiting the spark arrestor into the housing in a downwards trajectory towards the dust collection hopper.

In another embodiment, a dust collector includes a dust collector housing having a filter mounting arrangement configured to retain replaceable air filters within the dust collector housing, and a dust collection hopper positioned below the filter mounting arrangement. The dust collector also includes a spark arrestor that includes a spark arrestor housing attached to the dust collector housing and an inlet adaptor coupled to the spark arrestor housing and having vanes for directing air into the spark arrestor housing in a predefined direction. The inlet adaptor has an adaptor inlet that defines a duct mounting plane. The inlet adaptor is configured to change the dust mounting plane of the adaptor inlet without changing the predefined direction in which the vanes direct air into the spark arrestor housing.

In another embodiment, a dust collector includes a housing having a body, an inlet, and an outlet, and a spark arrestor coupled to the body at the inlet. The spark arrestor includes a spark arrestor housing having a spark arrestor inlet and a spark arrestor outlet, wherein the spark arrestor outlet is positioned on a mounting side of the dust collector housing. The spark arrestor further includes a turn baffle disposed in the spark arrestor housing in a position that creates a tortuous flow path through the spark arrestor housing between the spark arrestor inlet and the spark arrestor outlet. The tortuous flow path of the spark arrestor includes: (i) a low inertia channel formed in the spark arrestor housing having an orientation that directs particles passing through the low inertia channel through an upper portion of the housing; and (ii) a high inertia channel formed in the spark arrestor housing, wherein a downstream portion of the high inertia channel has an orientation that directs particles passing through the high inertia channel through a lower portion of the housing.

In yet another embodiment, a method for arresting sparks includes separating high inertia particles and low inertia particles into separate airstreams, preferentially directing the low inertia particles to first region of a dust collector; and preferentially directing the high inertia particles to a second region of the dust collector, wherein the second region of the dust arrestor is clear of filters.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
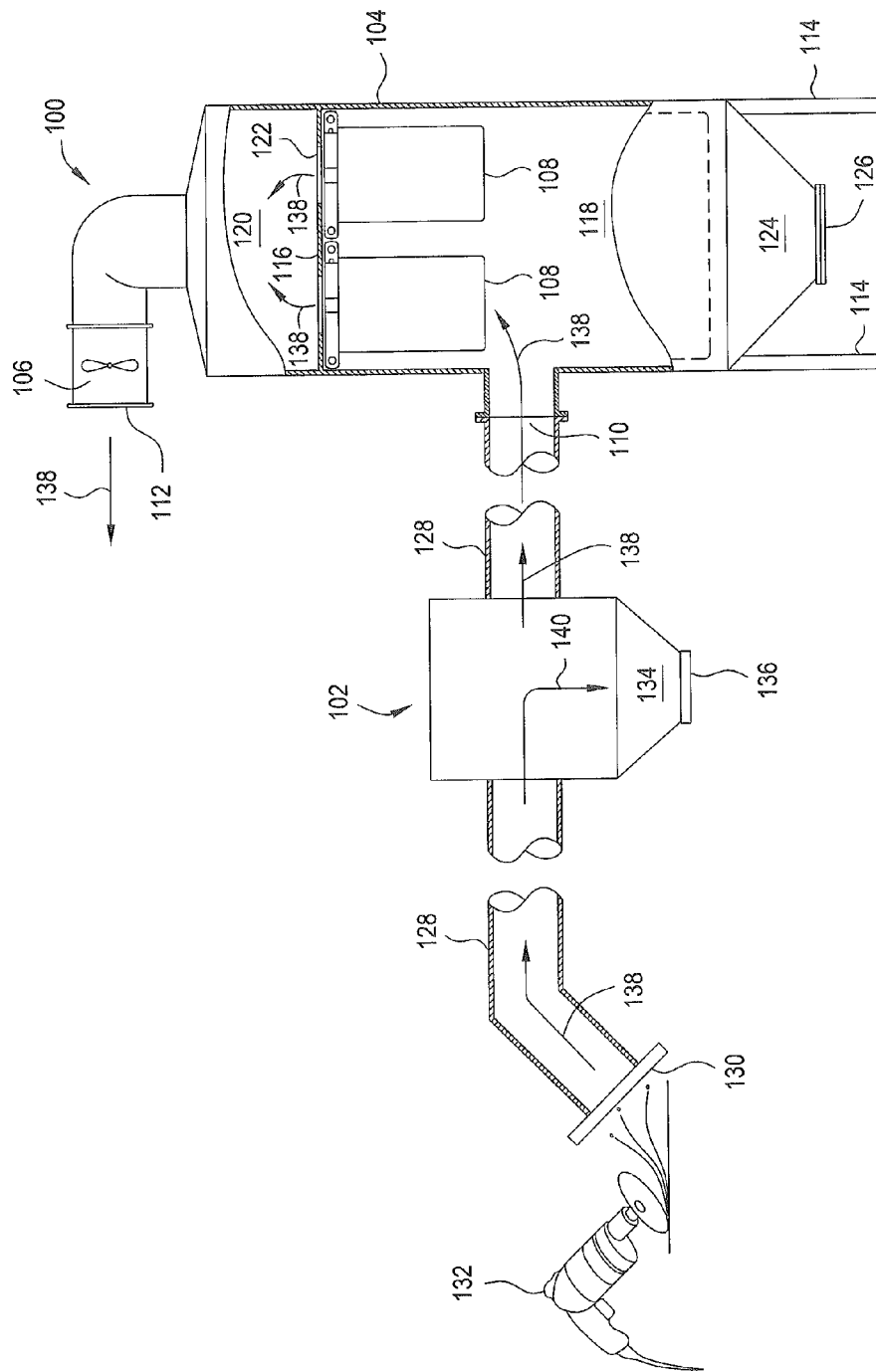
FIG. 1 is a partial cut away elevation of one embodiment of a dust collector having a conventional spark arrestor known in the art.
Figure 2A:
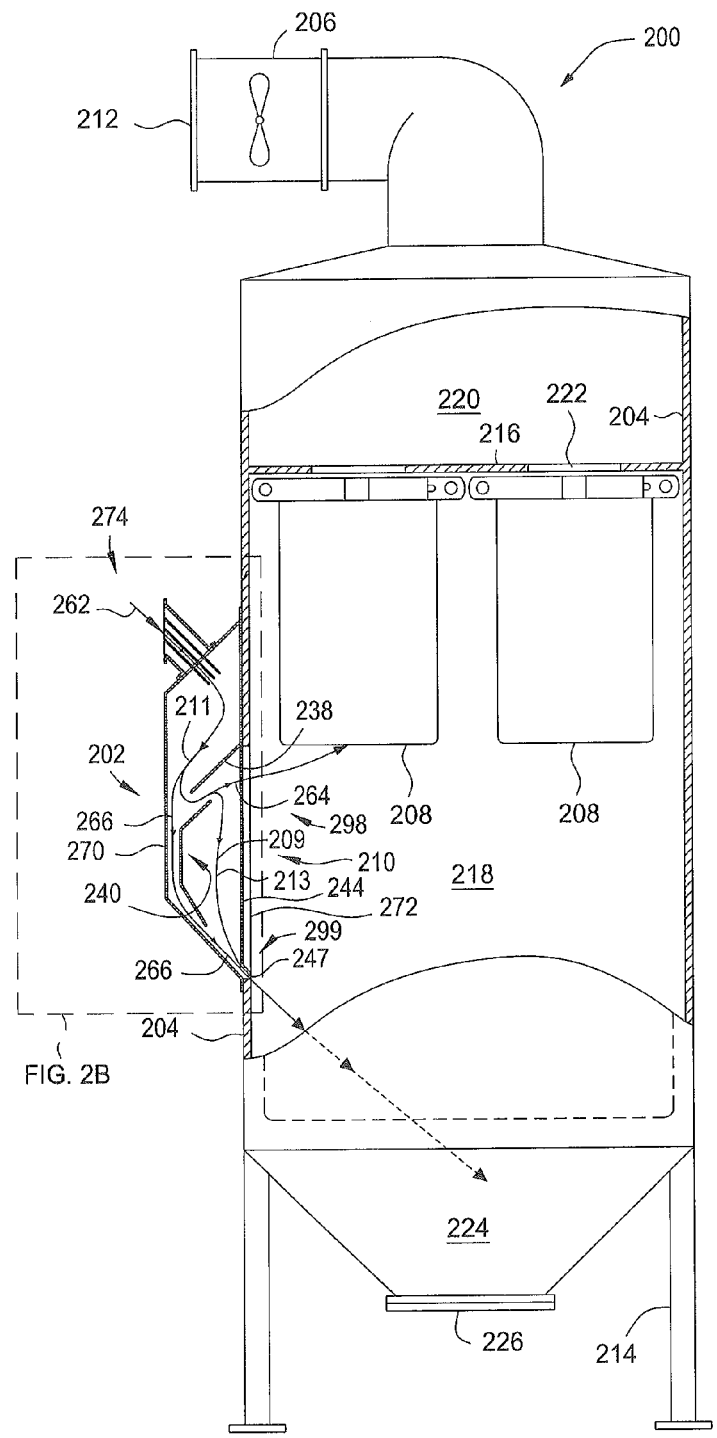
FIG. 2A is a partial cut away elevation of one embodiment of a dust collector having a spark arrestor disposed thereon.

FIG. 2A is a partial cut away elevation of one embodiment of a spark arrestor 202 coupled to a dust collector 200. Although the spark arrestor 202 as illustrated is used in an exemplary embodiment of the dust collector 200, it is contemplated that embodiments of spark arrestors described herein may be utilized in dust collectors of varying designs, including those available from different manufactures. The spark arrestor 202 may also be provided integrally with new dust collectors or be added to existing dust collectors present in the field.

The dust collector 200 is similar to the dust collector 100 and includes a housing 204 that is coupled to an air mover 206, such as a fan or blower, for drawing air through at least one replaceable air filter 208 mounted in the housing 204. The air mover 206 may be mounted to or be remote from the housing 204. The housing 204 is constructed from a rigid material suitable to withstand the operational pressures and loading for which the particular dust collector is designed.

The housing 204 includes an inlet 210 and an outlet 212. The inlet 210 has an upper portion 298 and a lower portion 299. The housing 204 may be supported by legs 214 and includes a tube sheet 216 which separates the interior of the housing 204 into a dirty air plenum 218 and a clean air plenum 220. The dirty air plenum 218 is in communication with the inlet 210 of the housing 204 while the clean air plenum 220 is in communication with the outlet 212 of the housing 204. The one or more air filters 208 are sealingly mounted to the tube sheet 216 such that air passing through a filter aperture 222 formed through the tube sheet 216 from the dirty air plenum 218 to the clean air plenum 220, must first pass through on the air filters 208.

Not shown in FIG. 2A, the dust collector 200 may optionally include a filter cleaning system which is operable to remove at least a portion of the dust cake formed on the air filter 208 during operation. The filter cleaning system may vibrate, shock or utilized air jets to knock at least a portion of the dust cake formed on the air filter into a collection hopper 224 formed in the lower portion of the housing 204. The collection hopper 224 includes a door 226 which may be periodically opened to remove the dust or other filtered materials from the dust collector 200.

Figures 2B, 2C:
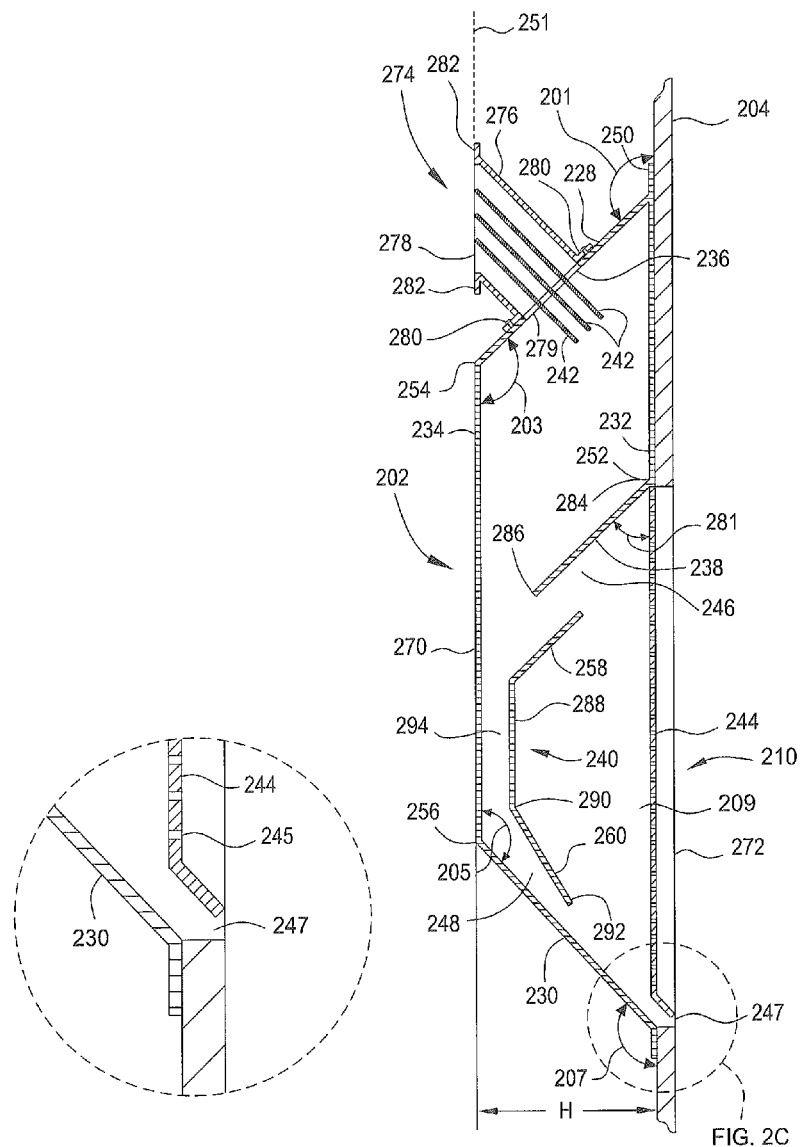
FIG. 2B is an enlargement of the partial cut away elevation of the dust collector of FIG. 2A.
FIG. 2C is an enlargement of the partial cut away elevation of the dust collector of FIG. 2B.

Referring to FIGS. 2A and 2B, the spark arrestor 202 includes a housing 270 and an inlet adapter 274. The housing 270 includes a top wall 228, a bottom wall 230, a first sidewall 232, a second sidewall 234, an inlet 236 and an outlet 272. In one embodiment, the housing 270 also includes a turn baffle 238 and a scalping baffle 240. The first sidewall 232 is configured to be located adjacent the dust collector housing 204 and includes a first end 250 and a second end 252, and the second sidewall 234 includes a first end 254 and a second end 256. The top wall 228 is coupled to the first sidewall 232 at the first end 250 and coupled to the second sidewall 234 at the first end 254. In one embodiment, the top wall 228 is coupled to the first sidewall 232 at an angle 201 that is less than 90 degrees and is coupled to the second sidewall 234 at an angle 203 that is greater than 90 degrees. The bottom wall 230 is coupled to the second sidewall 234 at the second end 256 and to the housing 204. In one embodiment, the bottom wall 230 is coupled to the second sidewall 234 at an angle 205 that is greater than 90 degrees, and is coupled to the housing 204 at an angle 207 that is greater than 90 degrees. The distance between the second wall 234 and the outlet is defined by "H."

The inlet adapter 274 is coupled to the top wall 228 over the inlet 236. In one embodiment, the inlet adapter 274 includes a body 276 having an adapter inlet 278, an adapter outlet 279, a mounting flange 280, a ductwork mounting flange 282, and one or more guide vanes 242. In one embodiment, a plurality of guide vanes 242 are disposed partially within the inlet adapter body 276 and extend out of the adapter outlet 279 and into the spark arrestor housing 270. The guide vanes 242 straighten air flow going through the inlet adapter 274 and out of the adapter outlet 297, thus creating a substantially unidirectional air flow entering the housing 270. In one embodiment, the guide vanes 242 are oriented at an angle between about 30 and about 60 degrees, for example about 45 degrees, to a plane 251 defined by the adapter inlet 278 and between about 60 to about 120 degrees, for example 90 degrees, to the plane 251 defined by the adapter outlet 279.

Figure 3:
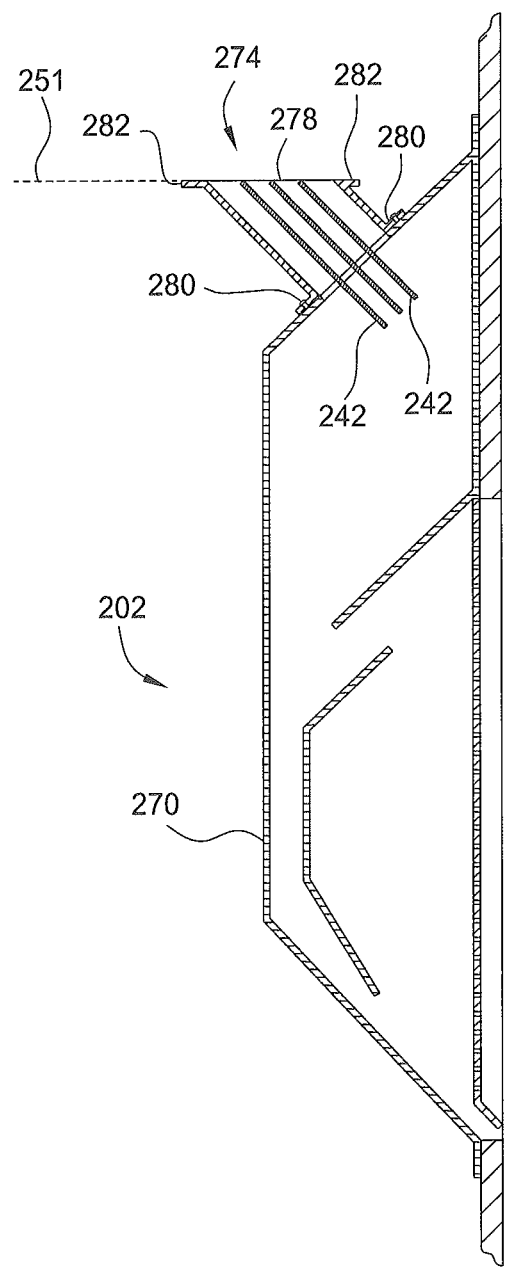
FIG. 3 is a partial cut away elevation of one embodiment of a dust collector having a spark arrestor disposed thereon.

In one embodiment, the inlet adapter 274 is reversible so as to change the angular orientation of the plane 251 of the adapter inlet 278 relative to the spark arrestor housing 270. As shown in FIGS. 2A and 2B, the plane 251 of the adapter inlet 278 has a vertical orientation, i.e., in a vertical plane, and is configured to accept horizontally oriented ductwork at the ductwork mounting flange 282. The inlet adapter 274 is detachable from the spark arrestor housing 270 at the mounting flange 280, and the inlet adapter 274 is configured to rotate 180 degrees about an axis that passes between the adapter inlet 278 and the adapter outlet 279 to change the angular orientation of the plane 251 of the inlet adapter 274. As shown in FIG. 3, the inlet adapter inlet 274 can be mounted to the spark arrestor housing 270 in a manner that changes the orientation about 90 degrees of the plane 251 of the adapter inlet 278 from that shown in FIGS. 2A and 2B. Here, the plane 251 of the adapter inlet 278 has a horizontal mounting orientation, i.e., horizontal plane, and is configured to accept vertically oriented ductwork at the ductwork mounting flange 282. Beneficially, guide vanes 242 of the inlet adapter 274 remain at substantially the same angle relative to the spark arrestor housing 270, independent of the orientation of the plane 251 of the adapter inlet 278, such that air entering the spark arrestor housing 270 has the same directionality no matter what the orientation of the adapter inlet 278 or ductwork coupled thereto.

Figure 4:
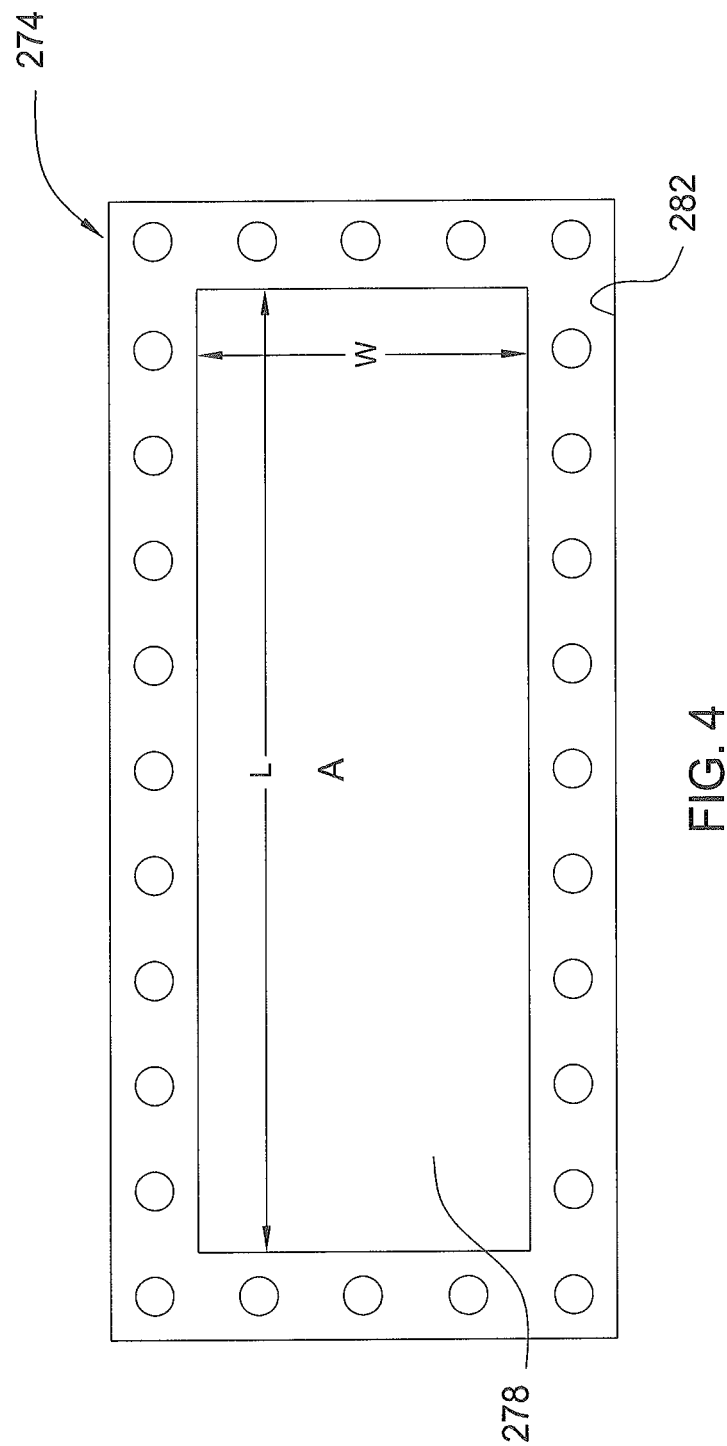
FIG. 4 is one embodiment of a front view of a spark arrestor inlet adapter.

Referring to FIGS. 2B and 4, the inlet adapter 274 (guiding vanes 242 are shown removed for clarity) has a length defined by "L," a width defined by "W," and a surface area of the adapter inlet 278 defined by "A." In one embodiment, the inlet adapter 274 has a high length L to width W aspect ratio to advantageously direct air flow through the surface area A and more easily into the spark arrestor inlet 236. For example, in one embodiment, the inlet adapter 274 has a length L to width W aspect ratio of less than about 4:1, for example, about 3.6:1. As the width W decreases, the air flowing through the adapter inlet 278 is more confined and advantageously configured to take on a tortuous path 211 (as seen in FIG. 2A) in the spark arrestor 202. Additionally, a high length L to width W aspect ratio allows the distance H, shown in FIG. 2B, to be minimized without the expense of increased pressure drop within the spark arrestor 202. This advantageously allows for a smaller spark arrestor and overall reduced footprint of the spark arrestor housing 270.

Referring to FIGS. 2A-2C, at least some embodiments of the spark arrestor 202 may include an optional diffuser grate 244 that extends substantially along the length of the outlet 272. The diffuser grate 244 may be perforated and include apertures 245 to uniformly distribute air exiting the spark arrestor 202 into the dust collector 200. In one embodiment, the diffuser grate 244 includes a slot 247 that is formed either in the diffuser grate 244 or between an end of the diffuser grate 244 and the bottom wall 230. The slot beneficially allows high inertia particles to pass unimpeded to the dust collector hopper 224 and requires less of a need to open the spark arrestor 202 for cleaning.

The turn baffle 238 redirects air entering the spark arrestor 202 so that the air takes on the tortuous path 211 through the spark arrestor 202. The turn baffle 238 that has a first end 284 and a second end 286. The turn baffle 238 is coupled to the second end 252 of the first sidewall 232 at the first end 284, and extends towards the second sidewall 234. The turn baffle 238 slopes downwards towards the bottom wall 230. In one embodiment, the turn baffle 238 is sloped at an angle 281 that is less than 90 degrees.

The scalping baffle 240 functions to split the air traveling in the tortuous path 211 into a high inertial channel 294 and a low inertial channel 246. The scalping baffle 240 has a substantially "C" shaped body including a top portion 258, a middle portion 288, and a bottom portion 260. The bottom portion 260 has an entrance end 290 and a tip 292. The top portion 258 of the scalping baffle 240 and the second end 286 of turn baffle 238 form the entrance of the low inertia channel 246. The second end 256 of the second sidewall 234 and the middle portion 288 of the scalping baffle 240 form the high inertia channel 294. The entrance to the high inertia channel 294 is located at the outer radial portion of one of the bends in the tortuous flow path 211 while the adjacent entrance to the low inertia channel 246 is located at the inner radial portion of the bend in the tortuous flow path 211. Since high inertia particles, such as sparks and the like, have more resistance to direction change and therefore travel predominantly along outer radial portions of the bends in the tortuous flow path 211, the high inertia particles preferentially enter the high inertia channel 294 relative to the low inertia channel 264.

The bottom portion 260 of the scalping baffle 240 and the bottom wall 230 of the scalping channel 240 form a tapered portion 248 at the end of the high inertial channel 294. The tapered portion 248 of the high inertia channel is wider near the entrance end 290 and is narrower near the tip 292 of the bottom portion 260 of the scalping baffle 240. The tapered portion 248 of the high inertia channel 294 is oriented at a downward angle relative to horizontal and is configured to direct air and particles exiting the spark arrestor 202 in a downward trajectory (i.e., less than zero degrees relative to horizontal), and away from the air filters 208 disposed in the dust collector housing 204.

A back channel 209 is also formed between the scalping baffle 240 and the spark arrestor outlet 272. In one embodiment, the back channel 209 has a substantially vertical orientation that is parallel to the middle portion 288 of the scalping baffle 240.

In one mode of operation, particle laden air 262 enters the spark arrestor 202 mounted to the dust collector 202 through the inlet adapter 274. In one embodiment, the air 262 is provided through ductwork that is connected to the adapter inlet 278 at the ductwork mounting flange 282. The particulate laden air 262 enters the adapter inlet 278 and flows between the guiding vanes 242. The guiding vanes 242 straighten the particulate laden air 262 flowing into the spark arrestor inlet 236 so as to direct the particulate laden air 262 towards the turn baffle 238, which causes the particulate laden air 262 to take the tortuous flow path 211. In one embodiment, the tortuous flow path 211 is defined as a non-linear flow path or a flow path without a straight line of sight. The tortuous flow path 211 includes a portion spit between: (i) a low inertia air flow 264 having air flowing through that is predominately made up of smaller and lighter particles, therefore particles having low inertia, and (ii) a high inertia air flow 266, having air flowing through that is predominantly made up of larger and heavier particles, therefore particles having high inertia. In one embodiment, the large particles, such as sparks, are predominantly entrained in the high inertia air flow 266.

In one embodiment, the tortuous flow path 211 causes the low inertia air flow 264 to pass through the low inertial channel 246, through the spark arrestor outlet 272 and into the upper portion 298 of the inlet 210 of the dust collector 200, towards the filters 208. The small particles in the low inertia air flow 264 enter the dirty air plenum 218, wherein the air mover 206 draws air through the air filters 208 mounted in the housing 204. The air flows through the filter apertures 222 of the air filters 208 and into to the clean air plenum 220 as clean air. The clean air exits the housing 204 through the outlet 212.

In one embodiment, the tortuous flow path 211 causes the high inertia air flow 266 to pass through the high inertia channel 294. The high inertia air flow 266 having heavier particles traveling through the high inertial channel 294 is directed in a downward trajectory out of the spark arrestor outlet 272 and into the bottom portion 299 of the inlet 210 of the dust collector 200, and into the dirty air plenum 218 in a trajectory away from the air filters 208. Due to the weight of the heavier particles and the downward entrance into the bottom portion 299 of the inlet 210, the heavier particles fall towards and into the hopper 224. In embodiments that include the diffuser grate 244, the high inertia air flow 266 passes through the tapered channel 248 in a downward trajectory through the slot 247 towards the spark arrestor outlet 272. The slot 247 advantageously allows the heavier particles, being in larger in size, to exit through the spark arrestor outlet 272 more freely and into the bottom portion 299 of the inlet 210 of the dust collector 200.

Additionally, backpressure created by the tapered portion 248 of the high inertia channel 294 directs air having predominantly low inertia particles through the low inertia channel 246 as the low inertia particles will more readily change direction with the air flow, and thus aid in directing the low inertia particles into the low inertia channel 246 and into the dirty air plenum 218 towards the air filters 208.

A small percentage of heavier particles having high inertia in the tortuous flow path 211 will inadvertently be presented in the low inertia channel 246. As the velocity of the low inertia air flow 264 in the low inertia channel 246 decreases as the low inertia air flow 264 moves closer towards the spark arrestor outlet 272, the heavier particles may settle out of the low inertia channel 246 and drop into the back channel 209. The back channel 209 allows heavier particles to be re-entrained with other heavier particles entrained in the high inertia air flow 266 exiting the spark arrestor outlet 272, thus, reducing the probability of sparks in the heavier particles being directed at and damaging the air filters 208.

The above described spark arrestors advantageously draw heavy particles, i.e. sparks, into a dust collector towards a hopper and away from the filters and beneficially allows for a spark arrestor integrated with the dust collector without additional steps of cleaning and removing the sparks.

Additionally, as the spark arrestor attached to the dust collector housing has no integral dust collection hopper, and that the spark arrestor utilizes the integral dust collection hopper integrally formed at the bottom of the dust collector housing, a much larger amount of particles may be separated by the spark arrestor and collected by the dust collector prior to having the hopper emptied as compared to conventional spark arrestors having relatively small collection hoppers integral to the spark arrestor itself. This advantageously lengthens the service interval and reduces the cost of ownership. Moreover, since access to a separate spark arrestor hopper need not be accommodated, a more efficient utilization of the facility layout may be achieved as space may be utilized for other processes, equipment and the like.

While the foregoing is directed to embodiments of the present disclosure, other and further embodiments of the disclosure may be devised without departing from the basic scope thereof, and the scope thereof is determined by the claims that follow.

What is claimed is:

1. A spark arrestor comprising:
   a housing having an inlet and an outlet, wherein the outlet is positioned on a dust collector mounting side of the housing; and
   a turn baffle disposed in the housing in a position that creates a tortuous flow path through the housing between the inlet and the outlet, wherein the tortuous flow path comprises:
      a low inertia channel formed in the housing having an orientation that directs particles passing through the low inertia channel through an upper portion of the outlet of the housing;
      a scalping baffle formed in the housing and below the turn baffle, wherein a top portion of the scalping baffle and the turn baffle define the low inertia channel; and
      a high inertia channel formed in the housing, wherein a downstream portion of the high inertia channel has an orientation that directs particles passing through the high inertia channel through a lower portion of the outlet of the housing.

2. The spark arrestor of claim 1, wherein the high inertia channel comprises a scalping channel and the downstream portion of the high inertia channel is tapered.

3. The spark arrestor of claim 2, wherein a bottom portion the scalping baffle and a bottom wall of the housing define the tapered channel.

4. The spark arrestor of claim 2, wherein a middle portion of the scalping baffle and a sidewall of the housing define the scalping channel, and wherein the sidewall is opposite the dust collector mounting side of the housing.

5. The spark arrestor of claim 4, wherein the tortuous flow path further comprises a back channel formed in the housing having an orientation that directs particles passing through the low inertia channel to the lower portion of the outlet of the housing through the tapered portion of the high inertia channel.

6. The spark arrestor of claim 5, wherein the middle portion of the scalping baffle and the dust collector mounting side of the housing define the back channel.

7. A dust collector, comprising:
   a dust collector housing comprising:
      a filter mounting arrangement configured to retain replaceable air filters within the dust collector housing; and
      a dust collection hopper positioned below the filter mounting arrangement; and
   a spark arrestor comprising:
      a spark arrestor housing attached to the dust collector housing; and
      an inlet adaptor coupled to the spark arrestor housing and having vanes for directing air into the spark arrestor housing in a predefined direction, the inlet adaptor having an adaptor inlet defining a dust mounting plane, the inlet adaptor configured to change the dust mounting plane of the adaptor inlet without changing the predefined direction in which the vanes direct air into the spark arrestor housing, the spark arrester housing comprising:
      a turn baffle disposed in the housing in a position that creates a tortuous flow path through the housing between the inlet and the outlet, wherein the tortuous flow path comprises:
         a low inertia channel formed in the housing having an orientation that directs particles passing through the low inertia channel through an upper portion of the outlet of the housing;
         a scalping baffle formed in the housing and below the turn baffle, wherein a top portion of the scalping baffle and the turn baffle define the low inertia channel; and
         a high inertia channel formed in the housing, wherein a downstream portion of the high inertia channel has an orientation that directs particles passing through the high inertia channel through a lower portion of the outlet of the housing.

8. A dust collector comprising:
   a housing having a body, an inlet, and an outlet; and
   a spark arrestor coupled to the body at the inlet, wherein the spark arrest comprises:

a spark arrestor housing having a spark arrestor inlet and a spark arrestor outlet, wherein the spark arrestor outlet is positioned on a mounting side of the dust collector housing; and a turn baffle disposed in the spark arrestor housing in a position that creates a tortuous flow path through the spark arrestor housing between the spark arrestor inlet and the spark arrestor outlet, wherein the tortuous flow path comprises;

a low inertia channel formed in the spark arrestor housing having an orientation that directs particles passing through the low inertia channel through an upper portion of the housing;

a scalping baffle formed in the housing and below the turn baffle, wherein a top portion of the scalping baffle and the turn baffle define the low inertia channel; and a high inertia channel formed in the spark arrestor housing, wherein a downstream portion of the high inertia channel has an orientation that directs particles passing through the high inertia channel through a lower portion of the housing.

9. The spark arrestor of claim 8, wherein the high inertia channel comprises a scalping channel and the downstream portion of the high inertia channel is tapered.

10. The spark arrestor of claim 9, wherein a middle portion of the scalping baffle and a sidewall of the housing define the scalping channel, and wherein the sidewall is opposite the dust collector mounting side of the housing.

11. The spark arrestor of claim 10, wherein the tortuous flow path further comprises a back channel formed in the housing having an orientation that directs particles passing through the low inertia channel to the lower portion of the outlet of the housing through the downstream portion of the high inertia channel.

* * * * *